April 28, 1959     L. C. THAYER     2,883,857
APPARATUS FOR MEASURING OXYGEN CONTENT
Filed Jan. 31, 1955
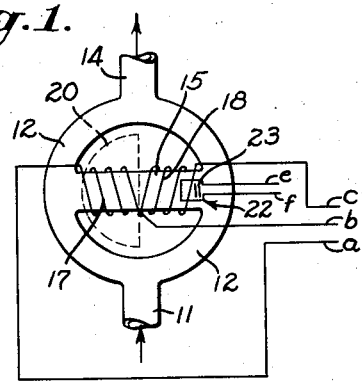
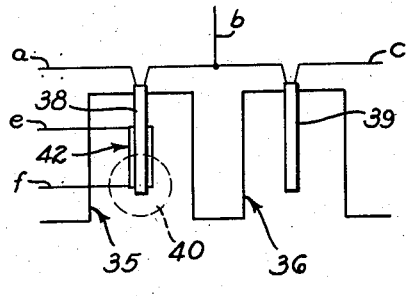
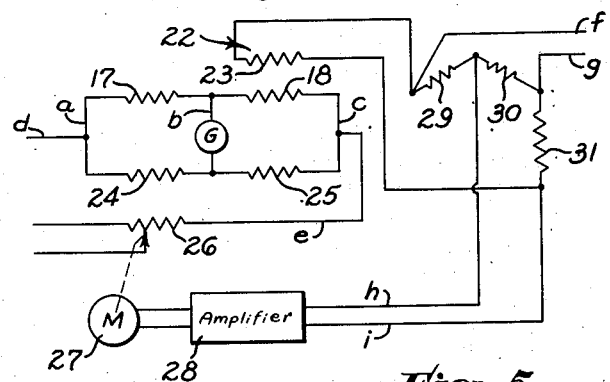
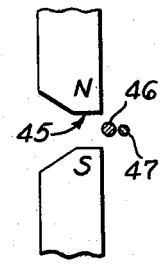
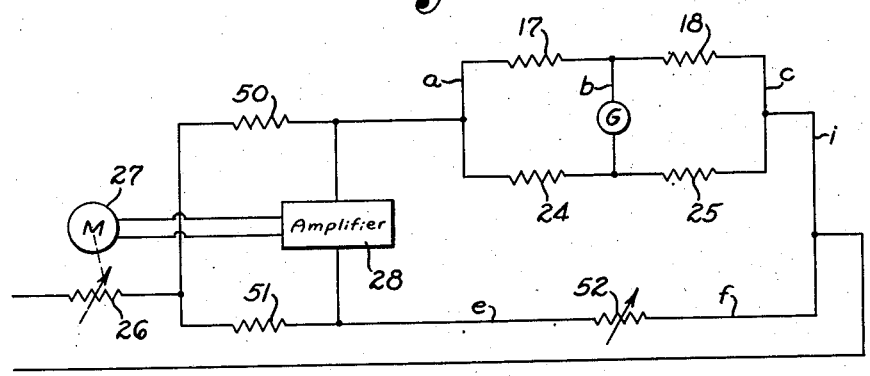
INVENTOR.
LOUIS C. THAYER
BY HIS ATTORNEYS.
HARRIS, KIECH, FOSTER & HARRIS United States Patent Office 2,883,857
Patented Apr. 28, 1959

2,883,857

APPARATUS FOR MEASURING OXYGEN CONTENT

Louis C. Thayer, Duarte, Calif., assignor, by mesne assignments, to Beckman Instruments, Inc., Fullerton, Calif., a corporation of California Application January 31, 1955, Serial No. 485,004

2 Claims. (Cl. 73—27)

The present invention relates to a new and improved apparatus for determining the amount of gas of relatively high magnetic susceptibility within a mixture of gases, and to apparatus for carrying out this method. Inasmuch as oxygen has a magnetic susceptibility which is greater than any other commonly encountered gas, the invention is primarily applied in assessing the oxygen content of gas mixtures.

In the past, a number of constructions have been suggested for the broad purpose indicated above. In general, these prior art devices are divided into two categories, depending upon whether they measure the magnetic susceptibility of oxygen directly or whether they measure this quantity by what has come to be known as the magnetic wind principle. Devices of the latter category operate by decreasing the magnetic susceptibility of a gas by heating, causing this gas of decreased susceptibility to be displaced within a magnetic field by unheated gas of the same composition. When the heat supplied is furnished by an electrical heating element in this type of device it is possible to compare the current consumption of an electrical heating element surrounded by a gas in a magnetic field with that of a like element surrounded by the same gas which is not in a magnetic field in order to obtain an indication of the magnetic content of the gas. The two heating elements employed can be disposed in separate cells, or can be placed adjacent to one another along a flow channel. In both cases, the electrical power consumption of the cells can be compared by a common Wheatstone bridge type of apparatus.

Inasmuch as the specific magnetic susceptibility of a paramagnetic gas such as oxygen varies inversely with the absolute temperature of the gas, it is possible to show mathematically that the force tending to move a gas out of a magnetic field in a device operating on the magnetic wind principle varies with both the initial and the final or exit temperature of the gas. The present practice is to allow the exit temperature of a gas in analysis apparatus of the class described to go uncontrolled and to regulate the temperature of the entering gas. It is also customary to regulate either the current or the voltage supplied to the bridge used with this apparatus. By these procedures nearly constant exit temperatures are obtained. Unfortunately, however, these prior procedures do not compensate for the differences in the exit gas temperature caused by the different heat transporting properties of different gases. The magnetic force moving the gas is determined by the final or exit temperature so that it must be controlled if the cooling of the heating element is to be related to the magnetic properties of the gas.

As an example of this deficiency of the prior procedures, reference is made to the fact that the introduction of hydrogen into a gas sample causes large errors in indicated paramagnetic gas content. These errors can be traced directly to the hydrogen picking up heat faster than the other gases present. The changed exit temperature resulting from this is manifested as a change in the force tending to repel the gas from a magnetic field.

One object of the present invention is to create an analysis apparatus based upon the magnetic wind principle which is not subject to the disadvantages of the prior procedures discussed above in very general terms.

More specifically, it is an object of the present disclosure to provide an apparatus for magnetic analysis of gas mixtures in which the exit gas temperature is regulated so that a substantially constant force is present tending to move the gas being analyzed. A still more specific object is to create a procedure in which a gas mixture containing a paramagnetic gas is heated to a predetermined temperature in a magnetic field so as to create a force in the field gradient tending to remove this gas from the field.

Another object is to provide an apparatus in which the temperature of the exit gas in an apparatus for the analysis of gases by the magnetic wind principle is employed to regulate the power supplied to the bridge employed with the apparatus so that this exit temperature will remain a substantially constant quantity regardless of the gas being analyzed. Since the process of the invention can be carried out when the heating elements employed in analyzing gases by the magnetic wind principle are disposed in separate cells of the same construction except that one cell is magnetized, or when the heating elements are disposed adjacent to one another along a gas flow channel, it is still another object of the invention to teach a process in which the temperature of the exit gas in both of these types of equipment is held substantially constant for the reason indicated above.

An object of the invention which is closely related to this latter object is to produce apparatus of either of the above broad types operating on the magnetic wind principle in which the temperature of the exit gas from the magnetic field is controlled to a substantially constant level.

This temperature control is best accomplished by disposing a temperature sensitive element within either the magnetized cell or the flow channel in either of the above indicated types of apparatus, at approximately the location where the highest temperature is to be found, and to use this temperature sensitive element to control the power supplied to the heating elements used. A further object, therefore, is to create apparatus as described in the preceding sentence in which such a temperature sensitive element is disposed at approximately the position of highest temperature of the exit gas from the magnetic field.

A closely related object is to utilize an element such as, for example, a coil of wire having an appreciable coefficient of resistance, a thermistor, or the like, to govern the power supplied to heating elements as indicated. Another object is to use such temperature sensitive resistance means to actuate appropriate servomechanisms to regulate this power supply.

Still further objects of the present invention, as well as the advantages of it, will be apparent from the balance of this specification, the appended claims, and the accompanying drawings, in which:

Fig. 1 diagrammatically illustrates one apparatus of the invention;

Fig. 2 diagrammatically illustrates a modified apparatus of the invention;

Fig. 3 diagrammatically illustrates part of a second modified apparatus of the invention;

Fig. 4 illustrates an electrical circuit employed with the invention; and

Fig. 5 illustrates a modified electrical circuit which may be employed with the invention.

Like numerals are used to designate like parts in all figures of the drawings.

Perhaps the invention will be best understood with reference to these drawings. In Fig. 1 there is illustrated an apparatus for assessing the oxygen content of gas by passing this gas through a flow tube around which there are disposed two heating elements. This apparatus is illustrated as consisting of a vertically disposed inlet 11 leading to annular channels 12, which, in turn, terminate with an outlet 14 which is aligned with the inlet 11. Midway between the inlet 11 and the outlet 14 within the apparatus shown in this figure, there is disposed a horizontal flow tube 15 communicating between the annular flow channels 12. Around this flow tube 15 are disposed first and second electrical resistance windings 17 and 18 respectively. These resistance windings are connected midway across the flow channel 15 with a common lead $b$. These resistance windings 17 and 18 are provided with terminal leads $a$ and $c$ as shown. The portion of the flow tube 15 covered by the resistance winding 17 is placed within a magnetic field 20 which may be created by an appropriately disposed permanent magnet or an electromagnet (not shown). The other extremity of the flow tube 15, that is, the portion of the flow tube 15 removed from the magnetic field 20, has disposed within it a small average temperature-sensing element 22 which may consist of a resistance coil 23 to which there are connected terminal leads $e$ and $f$. The heat capacity of the coil 23 must be very small and the heat conductivity of the leads $e$ and $f$ must also be small.

In operation of the device shown in Fig. 1, a gas mixture being analyzed is introduced through the vertically disposed inlet 11, from which it is broken up into two equal parts respectively traversing the annular channels 12 and then joining to flow out the vertically disposed outlet 14. A small portion of the gas flowing within these annular channels 12 tends to diffuse into the flow tube 15. By virtue of the fact that this flow tube is horizontally disposed, and that the pressures at its ends are equal, there is no gas pressure tending to cause gas to flow through it in the absence of the magnetic field or other means. However, when the heater is energized and a magnetic field such as magnetic field 20 is present, gases within the portion of the flow tube 15 within this magnetic field are heated by the resistance winding 17. This heating reduces the magnetic susceptibility of the paramagnetic gas present within the field, and there is a tendency for it to be replaced within the field by cooler gas from within one of the annular flow channels 12. This gas pushes the heated gas into the portion of the flow tube 15 surrounded by the resistance winding 18, and thence out past the temperature-sensing element 22 into the other annular flow channel 12, from which it is drawn out through the outlet 14. In accordance with the invention, the average temperature-sensing element 22 by virtue of the change in resistance of the resistance coil 23, is used to govern the power supplied to the resistance windings 17 and 18.

Perhaps the mechanism used to accomplish this purpose should be explained with reference to the circuit shown in Fig. 4 of the drawings. The leads $a$, $b$ and $c$ connecting the resistance windings 17 and 18 are connected together in the bridge circuit utilizing a galvanometer G attached to the lead $b$ and attached to bridge resistors 24 and 25. The bridge circuit incorporating the resistors 24 and 25 and the resistance windings 17 and 18 can be termed a "measuring bridge," and can be of either the balanced or unbalanced variety. If of the latter type, the galvanometer G is preferably calibrated. The current input to this measuring bridge is supplied through an input lead $d$ connected in parallel with resistance windings 17 and 24, and the output from this measuring bridge is taken through a lead $e$, as indicated in the drawings, leading through a control resistor 26 which is used to control the amount of current supplied to this measuring bridge.

The adjustment of the control resistor 26 is regulated through a servomotor 27, which, in turn, is governed by means of an amplifier 28 connected to a temperature-sensing bridge indicated at the right of Fig. 4. This temperature-sensing bridge is made up of temperature-insensitive resistors 29, 30 and 31 connected as shown to the resistance coil 23 forming one leg of this bridge. Power is supplied to the temperature-sensitive bridge through leads $f$ and $g$ in the established manner, and the amplifier 28 is connected to it through leads $h$ and $i$ as shown.

During the operation of the circuit described in this figure, any change in resistance of the temperature-sensing element 22 is immediately detected by means of the servoamplifier 28, and is transmitted to the servomotor 27 which adjusts by means of the resistor 26 the power supplied to the measuring circuit. By the specific circuit and connections shown, therefore, it is possible to precisely control the exit temperature of the gas from the flow tube 15. It is preferred to place the temperature-sensing element 22 employed within such portion of this flow tube 15 that it is approximately in the locale of the highest temperature found within the tube. This enables precise control of the exit temperature. This, in turn, directly in there being a constant force tending to move gases within the flow tube 15.

The herein described invention is not by any means restricted to a device in which a flow tube of the type shown in Fig. 1 is used. Thus, in Fig. 2 of the drawings, a different type of analysis apparatus employed in analyzing gases by the magnetic wind principle is illustrated as consisting of magnetic and nonmagnetic cells 35 and 36 respectively. In normal usage both of these cells are in communication with a flow channel of a gas being analyzed. Such flow channel is not shown because it is not deemed necessary to the understanding of the present invention. From it, gas diffuses into both of the cells 35 and 36 and within each of these cells is heated by rod-like electrical heating elements 38 and 39 respectively. The lower portion of the heating element 38 in the cell 35 is disposed within a magnetic field 40, which may either be caused by an electromagnet or a permanent magnet (not shown). Around the heating element 38 within the cell 35, there is disposed a temperature-sensing element 42 to which there are attached terminal leads $e$ and $f$. Appropriate leads $a$, $b$ and $c$, connect the heating elements 38 and 39 in the same manner in which the leads $a$, $b$ and $c$ were used to connect resistance windings 17 and 18 shown in the initial figure of the drawings. This is clearly illustrated in Fig. 2.

In operation of the cells shown in the modified construction illustrated in Fig. 2, gases within the cells 35 and 36 are heated by resistance elements 38 and 39, and therefore, will flow by convection upward along these elements and thence back along the sides of the cells. The flow of gas within the cell 35 will be aided because of the decreased magnetic susceptibility of gas within the magnetic field 40. By using a bridge structure employing the resistors 17 and 18, and a galvanometer G as shown in Fig. 4 of the drawings, it is possible with this two-cell construction to balance out the convection effects and to obtain a direct indication of the magnetic susceptibiliy of the gas. In order that such a measurement may truly reflect the paramagnetic gas content of the gas being analyzed, the temperature-sensing element 42 is disposed coaxially with the heating element 38 so as to determine the maximum temperature of the heated gas flowing upwardly along the heating element 38. This temperature-sensing element 42 may either be a resistance coil, a thermistor, or the like, and is preferably connected into an electric circuit with the rest of the components in the same manner in which the equivalent components illustrated in Fig. 1 were connected into the circuit illustrated in Fig. 4 of the drawings.

It is not necessary to limit the present invention to cells employing heating elements of the broad type diagrammatically represented in the modified construction of Fig. 2. Thus, for example, cells can be employed in which magnetic poles N and S, as shown in the second modified construction of Fig. 3 of the drawings, are disposed so as to leave a small passage 45 between them. At one side of these magnetic poles within a terminal extremity of the passage 45, there is disposed a resistance wire 46 directly adjacent to which there is disposed a parallel temperature-sensing wire 47. During the operation of this type of construction, gas within the passage 45 is heated by the heating element 46 and thus tends to flow around this element in an upward direction. The magnetic susceptibility of this gas is decreased as it becomes heated by the heating element 46 and this decreased susceptibility tends to encourage the flow of gas through the channel 45.

In order that the force resulting from this decreased susceptibility can be accurately measured, the temperature-sensing element 47 is disposed externally of the passage 45, as close to the heating element 46 as possible. In using the type of construction shown in Fig. 3, the current consumption of the heating element 46 is balanced against the current consumption of an equivalent element in a second cell having the same construction as indicated in Fig. 3, with the exception that the second cell does not possess a magnetic field. The precise method of balancing and of using the temperature-sensing element 47 is as described above in conjunction with Figs. 1, 2 and 4 of the drawings.

When the windings 17 and 18 are operated under conditions where the difference in temperature of these elements is very small, it is possible to use with the invention a modified circuit such as is shown in Fig. 5 of the drawings. In this modified circuit, the windings 17 and 18 are connected in a measuring-bridge arrangement, together with bridge resistors 24 and 25 as previously described in connection with Fig. 4 of the drawings. This measuring bridge is incorporated within a second bridge as one leg thereof. The other legs of this bridge are resistors 50 and 51 of a fixed value, and an adjustable control resistor 52. As indicated in the drawings, an amplifier 28 is connected between the resistors 51 and 52 and the measuring bridge, including the resistance elements or windings 17 and 18, and the resistor 50. This amplifier 28 is connected in turn to a servomotor 27 which serves to regulate through adjustment of a control resistor 26 the amount of power supplied in parallel to the resistors 50 and 51 and the balance of the circuit shown. The control resistor 52 is designed in such a manner that it may be adjusted by an operator so as to obtain the approximate operating conditions desired. Thus, the circuit shown in Fig. 5 of the drawings is simpler than the circuit shown in Fig. 4, and is principally adapted to be used where the extreme accuracy obtained with the circuit of Fig. 4 is not desired. When this circuit is used, average resistance of the windings 17 and 18 serves the function of the resistance coil 23 previously described.

Those skilled in the art will realize that wide modification may be made within the scope of the present invention without departing from the essential teachings thereof. As an example of this, many specific constructions involving flow channels or cells for the analysis of gases by the magnetic wind principle besides those shown can be employed. Such modifications are to be considered as part of the present inventive concept insofar as they are defined by the appended claims.

I claim as my invention:

1. A new and improved device for determining the oxygen content of gas compositions containing oxygen, which comprises: a first analysis cell; first electrical heating means disposed within said cell; a temperature-sensing means positioned adjacent to said first electrical heating means; a second analysis cell; a second electrical heating means disposed within said second analysis cell; means for supplying a magnetic field adjacent to one of said electrical heating means; means for connecting said heating means into an electrical circuit means for determining the respective power consumptions of said heating means as a measure of said oxygen content; and means connected to said temperature-sensing means to automatically regulate the power supplied said heating means so that the gas temperature at said temperature-sensing element remains substantially constant.

2. In an apparatus for the analysis of paramagnetic gas compositions by the magnetic wind principle, the combination of: means defining a flow channel; first and second resistance means disposed along said flow channel; means for supplying a magnetic field adjacent to said first resistance means; means connecting said first and second resistance means into a first bridge-analyzing circuit the output indication of which is a function of the paramagnetic gas present in the composition; a second bridge-analyzing circuit having said first bridge-analyzing circuit in one arm thereof; circuit means for coupling a source of power to said second bridge-analyzing circuit; and control means actuated by said second bridge-analyzing circuit for regulating the power supplied to said second bridge-analyzing circuit as a function of the temperature of said resistance means.

References Cited in the file of this patent

UNITED STATES PATENTS

| | | |
|---|---|---|
| 1,691,600 | Brush et al. | Nov. 13, 1928 |
| 2,603,964 | Foley et al. | July 22, 1952 |
| 2,603,965 | Medlock | July 22, 1952 |
| 2,652,315 | McEvoy | Sept. 15, 1953 |
| 2,729,097 | Cherrier | Jan. 3, 1956 |
| 2,759,354 | Cherry et al. | Aug. 21, 1956 |

FOREIGN PATENTS

| | | |
|---|---|---|
| 712,762 | Germany | Oct. 24, 1941 |